UNITED STATES PATENT OFFICE.

HERMAN HIRSCHAUER, OF JAMESTOWN, NEW YORK.

METHOD OF PREPARING SAUSAGE.

SPECIFICATION forming part of Letters Patent No. 448,341, dated March 17, 1891.

Application filed December 30, 1890. Serial No. 376,259. (No specimens.)

*To all whom it may concern:*

Be it known that I, HERMAN HIRSCHAUER, a citizen of the United States, residing at Jamestown, in the county of Chautauqua and State of New York, have invented certain new and useful Improvements in the Method of Making Sausage; and I do hereby declare the following to be a full, clear, and exact description of the invention.

My invention relates to the manufacture of sausage generally, and particularly to what is known as "Bologna;" and it consists of the method hereinafter fully described and claimed.

To enable others skilled in the art to which my invention appertains to make and use the same, I will now describe the manner in which my improved method is carried out.

In the manufacture of Bologna and what is known as "summer sausage" it has been customary to use some starchy substance, such as potato-flour, although flours made from wheat and rye have also been extensively used. This starchy substance is employed to solidify the materials of which the sausage is composed, but the difficulty has been that they soon harden and render the sausage dry and tasteless.

It is a well-known fact that it is practically impossible to make Bologna or summer sausage when the cattle have been feeding on grass without the use of some starchy matter similar to that above mentioned, as the flesh of the animals thus fed is too soft to make a sausage in summer as good or near as good as in winter, when the animals are fed on hard food, such as corn. To remove the difficulties incident to sausage having such starchy substance as that mentioned is the object of my present invention.

In carrying out my method I use what has heretofore been considered as a worthless product as far as sausage-making is concerned—namely, the rind of pork, which I first cut into small pieces and then place in a netting or perforated vessel of some suitable material, which is suspended or placed in a tank or vessel containing boiling water. This rind is allowed to remain in the boiling water until the strong and rancid oils are extracted and until the rind has assumed a soft or jelly-like condition. The rind when removed from the tank will be found to be a practically pure and gelatinous or gluey compound containing but little if any oil. Of the gelatinous substance thus obtained, which I chop very fine, I use about ten pounds to every one hundred pounds of beef previously chopped fine and seasoned to the taste in the usual manner. To the chopped beef and gelatinous product of the rind as above obtained I add a small proportion—say four or five pounds—of finely-chopped fat pork, and the whole mass is then thoroughly mixed and as much cold water added as the mass will absorb and at the same time cause the materials to adhere and remain moist. The amount of water to be added will necessarily vary according to the moisture of the beef and the season of the year, and when making summer sausage I find it desirable to increase the proportion of fat pork and seasoning used. After the materials have been thoroughly mixed the mass is stuffed or forced into the casings in any well-known manner, which are hung up and smoked for a short period, after which they are removed and boiled for a few minutes in a kettle or receptacle. When removed from the kettle or receptacle, they are ready for the market.

The addition of my gelatinous substance derived from boiling the pork-rind imparts to the sausage a delicious flavor and renders the sausage-meat firm and compact, while at the same time I reduce the cost of making sausage by utilizing what has heretofore been considered as waste in pork, at least as far as sausage-making has been concerned.

Having thus described my invention, what I claim as new, and desire to secure by Letters Patent, is—

The method herein described of compounding meats for sausage, consisting, essentially, in adding to previously-prepared chopped meat finely-chopped pork-rind reduced to a solid gelatinous condition by boiling and thoroughly mixing the same with the meat and finishing in the usual manner.

In testimony whereof I affix my signature in presence of two witnesses.

HERMAN HIRSCHAUER.

Witnesses:
 HERBERT W. TEW,
 L. M. BUTMAN.